(12) United States Patent
Bentley et al.

(10) Patent No.: US 9,166,629 B1
(45) Date of Patent: Oct. 20, 2015

(54) METHOD AND APPARATUS FOR USING PROFILE STRUCTURES TO DEPLOY COMPONENTS ON A SOFTWARE DEFINED RADIO

(71) Applicant: The Boeing Company, Chicago, IL (US)

(72) Inventors: Sean F. Bentley, Irvine, CA (US); Phuong N. Lam, Yorba Linda, CA (US)

(73) Assignee: THE BOEING COMPANY, Chicago, IL (US)

( * ) Notice: Subject to any disclaimer, the term of this patent is extended or adjusted under 35 U.S.C. 154(b) by 117 days.

(21) Appl. No.: 14/015,287

(22) Filed: Aug. 30, 2013

(51) Int. Cl.
*G06F 9/45* (2006.01)
*H04B 1/00* (2006.01)

(52) U.S. Cl.
CPC ............ *H04B 1/0003* (2013.01); *G06F 8/41* (2013.01); *G06F 8/423* (2013.01); *G06F 8/51* (2013.01)

(58) Field of Classification Search
None
See application file for complete search history.

(56) References Cited

U.S. PATENT DOCUMENTS

| | | | | |
|---|---|---|---|---|
| 6,741,639 | B1 * | 5/2004 | Yoshida et al. | 375/219 |
| 7,487,493 | B1 * | 2/2009 | Faulkner | 717/105 |
| RE45,021 | E * | 7/2014 | Kunisetty et al. | 717/137 |
| 2005/0235272 | A1 * | 10/2005 | Skinner | 717/136 |
| 2007/0078924 | A1 * | 4/2007 | Hassan et al. | 709/200 |
| 2010/0242020 | A1 | 9/2010 | Cho et al. | |
| 2010/0313197 | A1 | 12/2010 | Cho et al. | |
| 2012/0284288 | A1 | 11/2012 | Bickle et al. | |
| 2013/0139146 | A1 | 5/2013 | Bickle et al. | |
| 2013/0243055 | A1 * | 9/2013 | Choi et al. | 375/222 |
| 2013/0263100 | A1 * | 10/2013 | Mizrachi et al. | 717/149 |

OTHER PUBLICATIONS

Gonzalez, C., Design and Implementation of an Efficient SCA Framework for Software-Defined Radios, Master of Science Thesis, Virginia Polytechnic Institute and State University, May 10, 2006, 94 pages, [retrieved on Feb. 6, 2015], Retrieved from the Internet: <URL:http://scholar.lib.vt.edu/theses/available/etd-08242006-113217/>.*

Carrick, M., et al., OSSIE 0.8.2 Installation and User Guide, Apr. 2011, 104 pages, [retrieved on May 21, 2015], Retrieved from the Internet: <URL:http://ossie.wireless.vt.edu/download/user_guides/OSSIE_0.8.2_User_Guide.pdf>.*

Software Communications Architecture Specification 4.0 Users Guide version 1.0, Department of Defense, Joint Tactical Networking Center, Nov. 7, 2012, 77 pages, [retrieved on May 21, 2015], Retrieved from the Internet: <URL:http://jpeojtrs.mil/sca/Pages/default.aspx>.*

(Continued)

*Primary Examiner* — Thuy Dao
*Assistant Examiner* — Geoffrey St Leger
(74) *Attorney, Agent, or Firm* — Yee & Associates, P.C.

(57) ABSTRACT

A method and apparatus for processing a number of profiles for a software defined radio is provided. In one illustrative example, an apparatus comprises a pre-compiler and a compiler. The pre-compiler is configured to receive a number of profiles for the software defined radio in a first format. The pre-compiler is further configured to form a number of profile structures in a second format during build time based on the number of profiles. A profile structure in the number of profile structures corresponds to a profile in the number of profiles and includes a set of substructures comprised of a number of dynamic substructures and a number of static substructures. The compiler is configured to convert the number of profile structures into compiled code during the build time for use in deploying a set of components on the software defined radio at runtime.

20 Claims, 8 Drawing Sheets

(56) References Cited

OTHER PUBLICATIONS

Redhawk Manual Version 1.8 Revision 1.0, Mar. 26, 2013, 235 pages, [retrieved on May 21, 2015], Retrieved from the Internet: <URL:ftp://ftp.heanet.ie/disk1/sourceforge/r/project/re/redhawksdr/redhawk-doc/>.*

Redhawk Manual Version 1.8.5, Nov. 5, 2013, 261 pages, [retrieved on May 21, 2015], Retrieved from the Internet: <URL:ftp://ftp.heanet.ie/disk1/sourceforge/r/project/re/redhawksdr/redhawk-doc/>.*

* cited by examiner

METHOD AND APPARATUS FOR USING PROFILE STRUCTURES TO DEPLOY COMPONENTS ON A SOFTWARE DEFINED RADIO

BACKGROUND INFORMATION

1. Field

The present disclosure relates generally to software defined radios and, in particular, to pre-compiling and compiling operations for a software defined radio. Still more particularly, the present disclosure relates to a method and apparatus for creating profile structures during build time that can be used to deploy components on a software defined radio during runtime.

2. Background

A radio communications system may be used to send and/or receive data using radio waves. Radio waves include the electromagnetic waves having frequencies between about 3 kilohertz and about 300 gigahertz. These frequencies are referred to as radio frequencies (RF).

A software defined radio (SDR) is a radio communications system in which one or more of the physical layer functions of the radio communications system are defined by software, firmware, or a combination of the two running on one or more hardware devices. Different types of hardware devices may be used to run the software and/or firmware. These different types of hardware devices may include, but are not limited to, a field programmable gate array (FPGA), a digital signal processor (DSP), a general purpose processor (GPP), a programmable system on chip (SoC), and/or other types of programmable processor units.

A software defined radio is hereafter referred to as a radio. A waveform may be deployed on the radio to perform modulation when transmitting radio waves from a radio and/or demodulation when receiving radio waves at the radio. As used herein, a "waveform" is a radio function that includes everything used to describe a specific radio signal. A waveform includes a set of components that define, for example, without limitation, how a waveform is to be generated, encoded, modulated, filtered, and/or processed in some other manner. Deploying a waveform on a radio means deploying the set of components that form that waveform on the radio.

The waveform used for modulation and/or demodulation may be selected based on the channel used to transmit and/or receive data. As used herein, a "channel" is a specified range of frequencies for the radio waves being transmitted and/or received. The waveform that best matches the conditions for the channel is selected. These conditions may include, for example, a maximum energy capacity, a bandwidth, a level of noise, and/or other conditions for the channel.

The deployment of a waveform on a radio occurs during runtime. The Software Communications Architecture (SCA) is oftentimes used as the framework for deploying software components on radios and managing the lifecycle of these radios. With these types of radios, the Software Communications Architecture is used to define profiles that dictate the behavior of this framework. These profiles may be initially created using the extensible markup language (XML).

With currently available radios, the Software Communications Architecture profiles may be installed, parsed, interpreted, and enacted by the framework on the radio during runtime. However, the framework software currently available for performing these types of operations at runtime may be more expensive and/or heavyweight than desired when considering the reduced size, weight, and power (SWAP) requirements for radios. Additionally, performing these operations at runtime may slow down radio startup times and waveform deployment times.

In some cases, the Software Communications Architecture profiles may be parsed prior to runtime. In other words, these profiles may be parsed offline, or separate from the radio. For example, the profiles may be parsed and converted from the extensible markup language into a simpler text format to form parsed profiles. However, with these types of radios, the interpretation of these parsed profiles is still performed on the radio during runtime. In other words, the parsed profiles may only be further converted into profiles that the radio can use to actually deploy components during runtime. This type of process may not reduce radio startup times or waveform deployment times as much as desired. Therefore, it would be desirable to have a method and apparatus that take into account at least some of the issues discussed above, as well as other possible issues.

SUMMARY

In one illustrative example, an apparatus comprises a pre-compiler and a compiler. The pre-compiler is configured to receive a number of profiles for a software defined radio in a first format. The pre-compiler is further configured to form a number of profile structures in a second format during build time based on the number of profiles. A profile structure in the number of profile structures corresponds to a profile in the number of profiles and includes a set of substructures comprised of a number of dynamic substructures and a number of static substructures. The compiler is configured to convert the number of profile structures into compiled code during the build time for use in deploying a set of components on the software defined radio at runtime.

In another illustrative embodiment, a communications system comprises a software defined radio and a profile processor. The software defined radio is configured to deploy a set of components for use in configuring an operating environment of the software defined radio and forming at least one waveform. The profile processor comprises a pre-compiler and a compiler. The pre-compiler is configured to receive a number of profiles for the software defined radio in an extensible markup language. The pre-compiler is further configured to form a number of profile structures in a high level programming language during build time based on the number of profiles. A profile structure in the number of profile structures corresponds to a profile in the number of profiles and includes a set of substructures comprised of a number of dynamic substructures and a number of static substructures. The compiler is configured to convert the number of profile structures into compiled code during the build time for use in deploying the set of components on the software defined radio at runtime.

In yet another illustrative embodiment, a method for processing a number of profiles for a software defined radio is provided. A number of profiles for the software defined radio are received by a pre-compiler in a first format. A number of profile structures in a second format are formed during build time based on the number of profiles received. A profile structure in the number of profile structures corresponds to a profile in the number of profiles and includes a set of substructures comprised of a number of dynamic substructures and a number of static substructures. The number of profile structures is converted into compiled code during the build time for use in deploying a set of components on the software defined radio at runtime.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the illustrative embodiments recognize and take into account that it may be desirable to perform the parsing and interpretation of Software Communications Architecture profiles offline. In other words, it may be desirable to perform these operations separately from the radio during build time rather than on the radio during runtime.

The illustrative embodiments recognize and take into account that by breaking up the operations required for deploying a waveform on a radio, reduced size, weight, and power requirements may be met. Further, the illustrative embodiments recognize and take into account that radio startup times and waveform deployment times may be reduced by performing the parsing and interpretation of Software Communications Architecture profiles during build time, prior to runtime.

Figure 1:
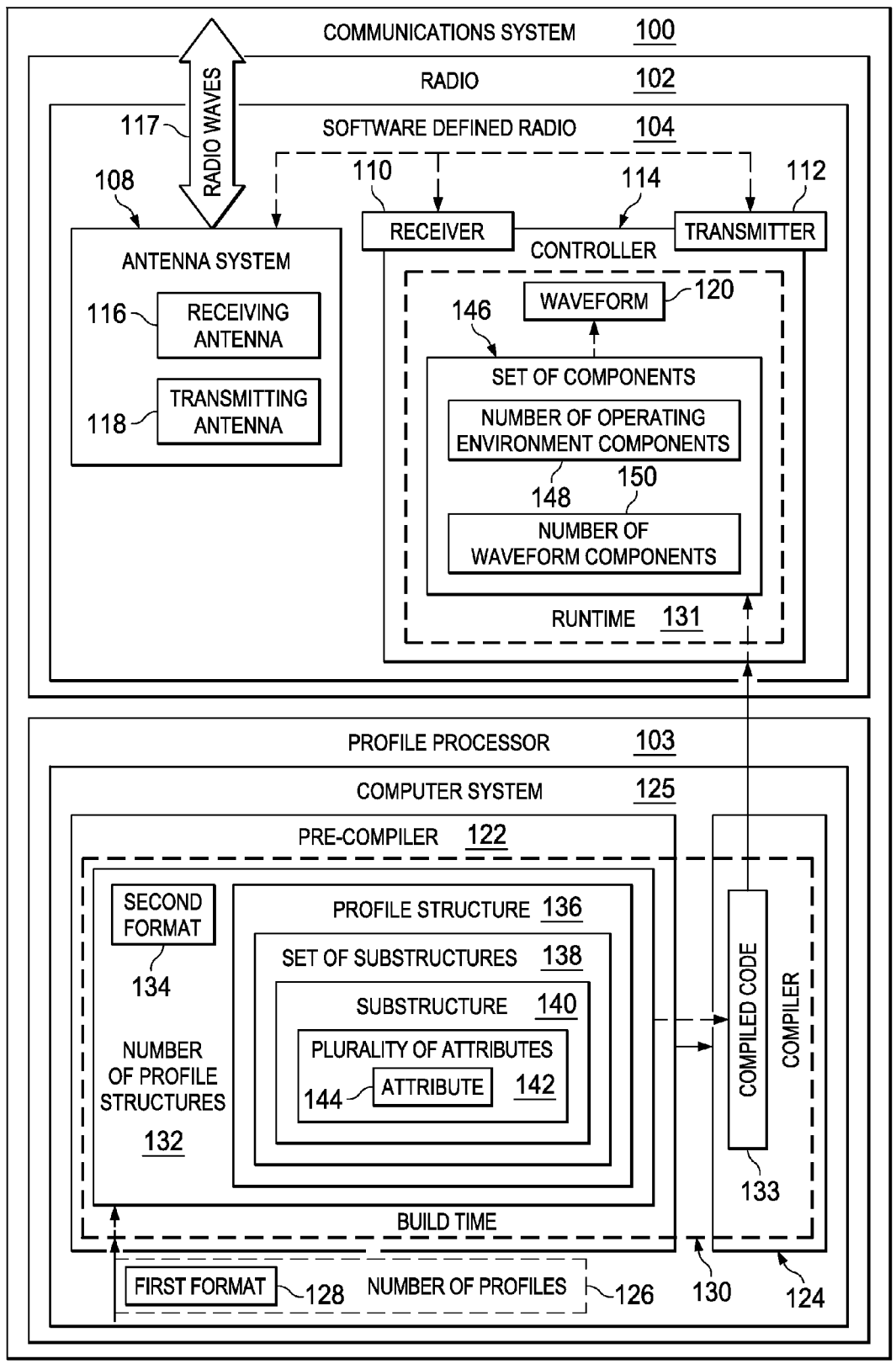
FIG. 1 is an illustration of a communications system in the form of a block diagram in accordance with an illustrative embodiment.

Referring now to the figures, and in particular, with reference to FIG. 1, an illustration of a communications system is depicted in the form of a block diagram in accordance with an illustrative embodiment. In this illustrative example, communications system 100 may include radio 102 and profile processor 103.

As depicted, radio 102 may take the form of software defined radio 104. As used herein, a "software defined radio" is a combination of hardware and software. In particular, with software defined radios, one or more of the physical layer functions of these radios are performed by software, firmware, or a combination of the two running on one or more hardware devices.

In these illustrative examples, radio 102 comprises antenna system 108, receiver 110, transmitter 112, and controller 114. In some cases, receiver 110 and transmitter 112 may be together referred to as a transceiver.

Antenna system 108 may comprise one or more antennas, depending on the implementation. In one illustrative example, antenna system 108 comprises receiving antenna 116 configured to receive radio waves 117 and transmitting antenna 118 configured to send radio waves 117. In another illustrative example, antenna system 108 comprises a single antenna configured to both receive and transmit radio waves 117.

In these illustrative examples, receiver 110, transmitter 112, and controller 114 comprise a combination of both hardware and at least one of software and firmware. As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Further, in these examples, a portion of controller 114 may be considered part of receiver 110, while a portion of controller 114 may be considered part of transmitter 112. In some cases, a portion of controller 114 may be shared by both receiver 110 and transmitter 112.

Controller 114 may be comprised of at least one of a digital signal processor, a processor unit, a computer, a field programmable gate array, an integrated circuit, or some other type of hardware device. In some illustrative examples, controller 114 may be referred to as a signal processor.

In this illustrative example, profile processor 103 may include pre-compiler 122 and compiler 124. Pre-compiler 122 and compiler 124 may be implemented using hardware, software, or a combination of the two. For example, pre-compiler 122 and compiler 124 may be implemented within computer system 125, which may be comprised of one or more computers in communication with each other. Of course, in other illustrative examples, pre-compiler 122 and compiler 124 may be implemented using a microprocessor, an integrated circuit, and/or some other type of device.

In this illustrative example, pre-compiler 122 and compiler 124 are configured to operate during build time 130. Radio 102 is configured to operate during runtime 131. Runtime 131 is the time during which an application, a program, and/or an executable file is being run on radio 102. Build time 130 may be the time before runtime 131. More specifically, build time 130 may be the time during which software is pre-compiled by pre-compiler 122 and compiled and/or linked by compiler 124 to form software components that may be deployed on radio 102 during runtime 131. In some cases, the processes that occur during build time 130 are referred to as offline processes and the processes that occur during runtime 131 are referred to as online processes.

As depicted, pre-compiler 122 is configured to receive number of profiles 126. As used herein, a "number of" items may include one or more items. In this manner, number of profiles 126 may include one or more profiles.

Number of profiles 126 may be a number of Software Communications Architecture (SCA) profiles. In particular, number of profiles 126 may be in first format 128 under the framework of the Software Communications Architecture. In one illustrative example, first format 128 may be based on a markup language such as, but not limited to, extensible markup language (XML). In other words, in this example, number of profiles 126 may be a number of XML profiles.

Each profile in number of profiles 126 may include one or more files that define how radio 102 is to be configured in order for radio 102 to deploy the proper operating environment and/or one or more selected waveforms. For example, at least a portion of number of profiles 126 may include information that describes waveform 120 and/or how radio 102 is to be configured in order for radio 102 to properly deploy waveform 120. Waveform 120 is actually deployed and modulated with data on radio 102 during runtime 131.

Waveform 120 may be a radio function that includes everything used to describe a specific radio signal. Waveform 120 may include a set of components that define, for example, without limitation, how a sampled waveform is to be generated, encoded, modulated, filtered, and/or processed in some other manner. In particular, waveform 120 may comprise a set of components that define how radio 102 is to modulate a signal carrying data or demodulate the signal carrying the data.

In order for waveform 120 to be deployed, number of profiles 126 may need to be parsed, interpreted, and converted into number of profile structures 132. Number of profile structures 132 may be in second format 134. Second format 134 may be a simpler format than first format 128. In this illustrative example, second format 134 may be based on a selected programming language, wherein selected programming language is a high level programming language such as, but not limited to, C or C++.

Compiler 124 may be configured to convert number of profile structures 132 into code that may be read by radio 102. For example, compiler 124 may at least one of compile and link number of profile structures 132 to form compiled code 133 that contains the content and organization of number of profile structures 132. More specifically, compiler 124 may process number of profile structures 132 by at least one of dynamically linking, statically linking, or compiling number of profile structures 132 to form compiled code 133. Radio 102 may be configured to use compiled code 133 to configure the operating environment of radio 102 and/or to deploy one or more selected waveforms on radio 102. In particular, compiled code 133 may be used to deploy set of components 146 on software defined radio 104 to configure an operating environment of software defined radio 104 and form at least one waveform to at least one of modulate or demodulate data within software defined radio 104.

Each profile structure in number of profile structures 132 may correspond to a profile in number of profiles 126. Profile structure 136 may be an example of one of number of profile structures 132. Profile structure 136 may be a data structure comprised of set of substructures 138. As used herein, a "set of" items may include one or more items. In this manner, set of substructures 138 may include one or more substructures.

Substructure 140 may be an example of one of set of substructures 138. Substructure 140 may include plurality of attributes 142. As used herein, an "attribute" may be metadata. Attribute 144 may be an example of one of plurality of attributes 142. Attribute 144 may take the form of some type of value or may take the form of a pointer that points to another substructure in set of substructures 138.

In this illustrative example, attribute 144 may be a static attribute or a dynamic attribute. When all of the attributes of a substructure are static attributes, that substructure may be referred to as a static substructure. When at least one of the attributes of a substructure is a dynamic attribute, that substructure may be referred to as a dynamic substructure.

When attribute 144 is a static attribute, attribute 144 cannot be changed and remains fixed, or static. In particular, a static attribute remains fixed during runtime 131. In other words, the portion of compiled code 133 that represents attribute 144 may not be changed by radio 102 when used by radio 102.

However, when attribute 144 is a dynamic attribute, attribute 144 may be variable or dynamic. In particular, a dynamic attribute may be modified by radio 102 during runtime 131. In other words, the portion of compiled code 133 that represents attribute 144 may be modifiable by radio 102 during runtime 131. Radio 102 may be capable of populating a value for a dynamic attribute based on the current state of radio 102. In this manner, set of substructures 138 may include a number of dynamic substructures and/or a number of static substructures.

In this illustrative example, compiled code 133 may include any number of libraries, executable files, machine code files, and/or other forms of code that may be readable by radio 102. Radio 102 may use compiled code 133 to deploy set of components 146 on radio 102 during runtime 131. Set of components 146 may include, for example, without limitation, number of operating environment components 148 and/or number of waveform components 150.

By using pre-compiler 122 and compiler 124 to parse, interpret, and convert number of profiles 126 into number of profile structures 132 and then into compiled code 133, radio startup times may be reduced. Further, waveform deployment times may be reduced.

In particular, the process used to deploy a waveform may be broken up between build time 130 and runtime 131. Pre-compiler 122 may perform the portion of the deployment process that involves parsing and interpreting number of profiles 126. Number of profile structures 132 may carry the distilled profile information from the build time interpretation process to the runtime deployment process on radio 102.

Figure 2:
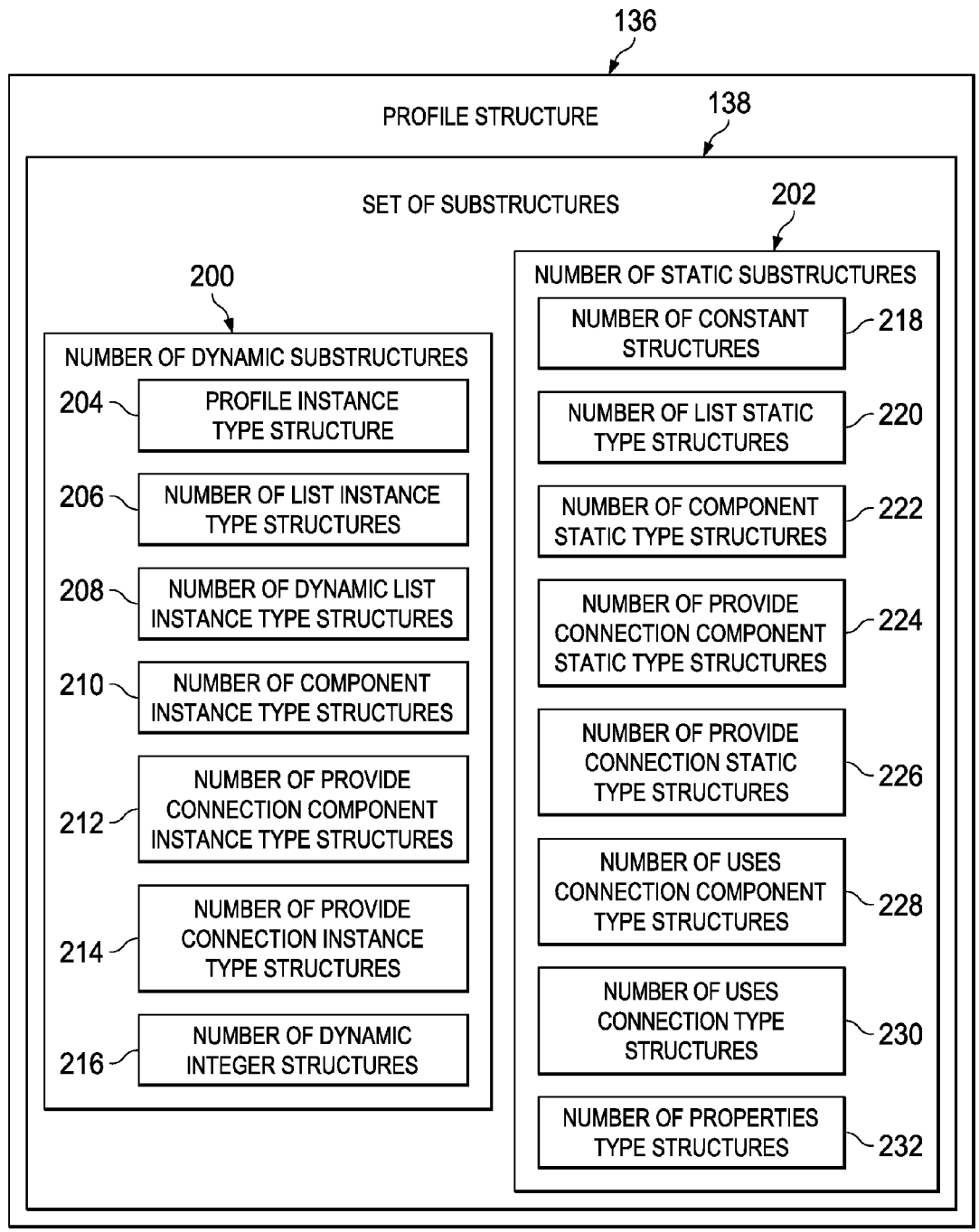
FIG. 2 is an illustration of a profile structure in the form of a block diagram in accordance with an illustrative embodiment.

With reference now to FIG. 2, an illustration of profile structure 136 from FIG. 1 is depicted in the form of a block diagram in accordance with an illustrative embodiment. As depicted, profile structure 136 may include set of substructures 138. Set of substructures 138 may include number of dynamic substructures 200 and number of static substructures 202.

Number of dynamic substructures 200 may include, for example, without limitation, profile instance type structure 204, number of list instance type structures 206, number of dynamic list instance type structures 208, number of component instance type structures 210, number of provide connection component instance type structures 212, number of provide connection instance type structures 214, number of dynamic integer structures 216, and/or other types of dynamic data structures.

Number of static substructures 202 may include, for example, without limitation, number of constant structures 218, number of list static type structures 220, number of component static type structures 222, number of provide connection component static type structures 224, number of provide connection static type structures 226, number of uses connection component type structures 228, number of uses connection type structures 230, number of properties type structures 232, and/or other types of static data structures.

Profile instance type structure 204 may be a base data structure for the particular profile to which profile structure 136 corresponds. Each of number of list instance type structures 206 and number of dynamic list instance type structures 208 may be configured to hold lists of information. Together, number of component instance type structures 210 and number of component static type structures 222 may identify one or more components that may make up a waveform. These components may include at least one of, for example, without limitation, a frequency component, a phase component, an amplitude component, or some other type of component.

Number of provide connection component instance type structures 212, number of provide connection instance type structures 214, number of provide connection component static type structures 224, and number of provide connection static type structures 226 may together identify one or more connection providers for the components. Number of uses connection component type structures 228 and number of uses connection type structures 230 may identify one or more uses for these connections provided. Further, number of properties type structures 232 may identify one or more different properties for a waveform.

Number of dynamic integer structures 216 may be used to hold, for example, index variables. Number of constant structures 218 may be used to hold constant values, constant integers, constant arrays, and/or other types of constant elements.

The different substructures in set of substructures 138 may be linked in a number of different ways. For example, an attribute in a dynamic substructure may point to a static substructure. In some cases, an attribute in a dynamic substructure may point to a constant. In another example, an attribute in a static substructure may point to a constant, an array, or some other static substructure.

By having number of static substructures 202, radio 102 may be able to read and use the code generated for these static substructures without having to process the code, interpret the code, manipulate the code, and/or perform other types of operations. However, number of dynamic substructures 200 may allow radio 102 to have some way of modifying runtime parameters and/or keeping track of the components being deployed.

Further, by building these substructures during build time 130 as opposed to runtime 131 in FIG. 1, radio startup times and component deployment times may be reduced. In particular, the amount of processing and/or "thinking" that radio 102 needs to do in order to deploy a waveform may be greatly reduced.

Number of dynamic substructures 200 and number of static substructures 202 may form profile structure 136 that is hyper-efficient. In particular, number of static substructures 202 may be loaded into read-only-memory on radio 102 during runtime 131 in order to increase the efficiency of radio 102 during runtime 131.

The illustrations of communications system 100 and radio 102 in FIG. 1 and profile structure 136 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 3:
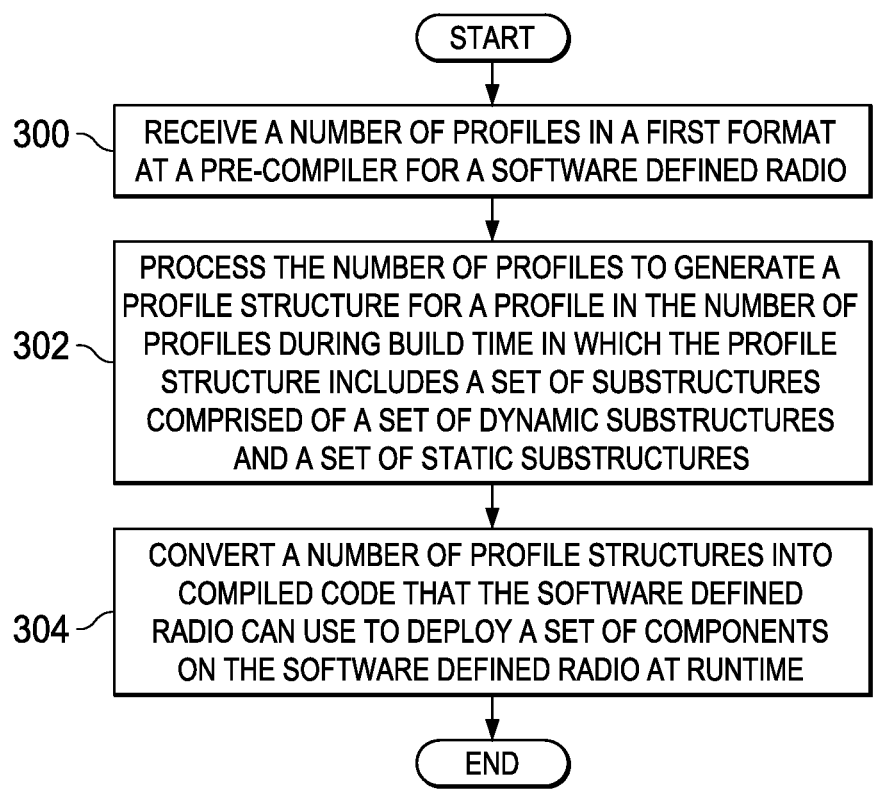
FIG. 3 is an illustration of a process for processing a number of profiles in the form of a flowchart in accordance with an illustrative embodiment.

With reference now to FIG. 3, an illustration of a process for processing a number of profiles is depicted in the form of a flowchart in accordance with an illustrative embodiment. The process illustrated in FIG. 3 may be implemented to manage a software defined radio, such as radio 102 in FIG. 1.

The process begins by receiving a number of profiles in a first format at a pre-compiler for a software defined radio (operation 300). The pre-compiler processes the number of profiles to generate a profile structure for a profile in the number of profiles during build time in which the profile structure includes a set of substructures comprised of a set of dynamic substructures and a set of static substructures (operation 302).

Next, a compiler for the software defined radio converts a number of profile structures into compiled code that the software defined radio can use to deploy a set of components on the software defined radio at runtime (operation 304), with the process terminating thereafter. The compiled code may retain the contents and the organization of each of the number of profile structures.

Figure 4:
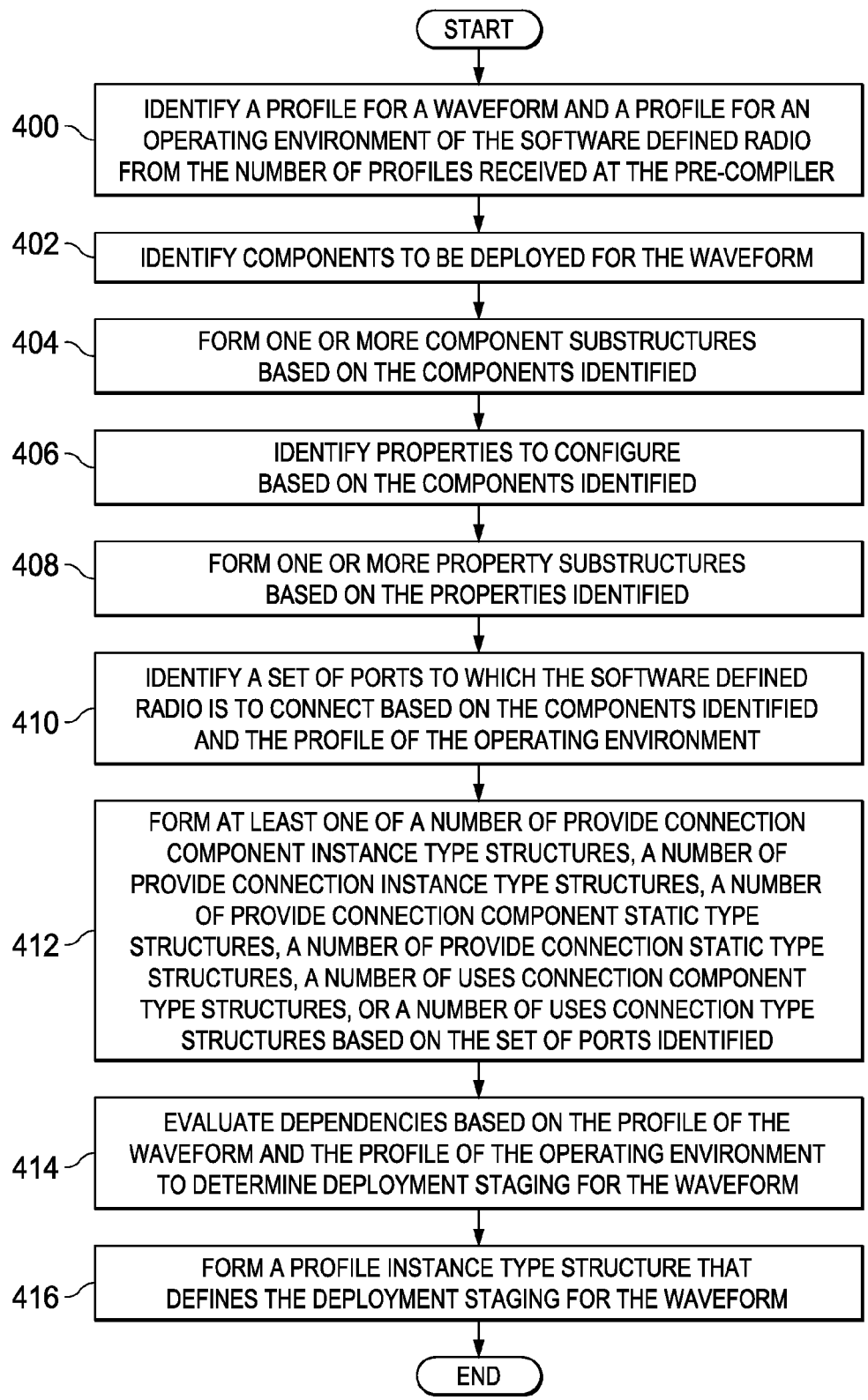
FIG. 4 is an illustration of a process for forming a number of profile structures in the form of a flowchart in accordance with an illustrative embodiment.

With reference now to FIG. 4, an illustration of a process for forming a number of profile structures is depicted in the form of a flowchart in accordance with an illustrative embodiment. The process illustrated in FIG. 4 may be used to perform operation 302 in FIG. 3. This process may be implemented by the pre-compiler.

The process begins by identifying a profile for a waveform and a profile for an operating environment of the software defined radio from the number of profiles received at the pre-compiler (operation 400). Next, the pre-compiler identifies components to be deployed for the waveform (operation 402). The pre-compiler generates one or more component substructures based on the components identified (operation 404). In operation 404, these substructures may include a number of component instance type structures and/or a number of component static type structures.

Thereafter, the pre-compiler identifies properties to configure based on the components identified (operation 406). Operation 400 may be performed by identifying a precedence for properties for the components. The pre-compiler then generates one or more property substructures based on the properties identified (operation 408). These property substructures may include a number of properties type structures.

Next, a set of ports to which the software defined radio is to connect is identified based on the components identified and the profile of the operating environment (operation 410). Operation 410 may be performed by determining profile connections and evaluating dependencies to determine domain connections. The pre-compiler may generate at least one of a number of provide connection component instance type structures, a number of provide connection instance type structures, a number of provide connection component static type structures, a number of provide connection static type structures, a number of uses connection component type structures, or a number of uses connection type structures based on the set of ports identified (operation 412).

The pre-compiler may then evaluate dependencies based on the profile of the waveform and the profile of the operating environment to determine deployment staging for the waveform (operation 414). The deployment staging for the waveform may be the manner in which the various components of the waveform may need to be deployed at various stages. The pre-compiler may then generate a profile instance type structure that defines the deployment staging for the waveform (operation 416), with the process terminating thereafter.

The process described in FIG. 4 is an example of one manner in which the set of substructures for a particular profile structure generated in operation 302 in FIG. 3 may be implemented. Of course, depending on the implementation, other types of substructures other than those indicated in FIG. 4 may be generated by the pre-compiler.

Figure 5:
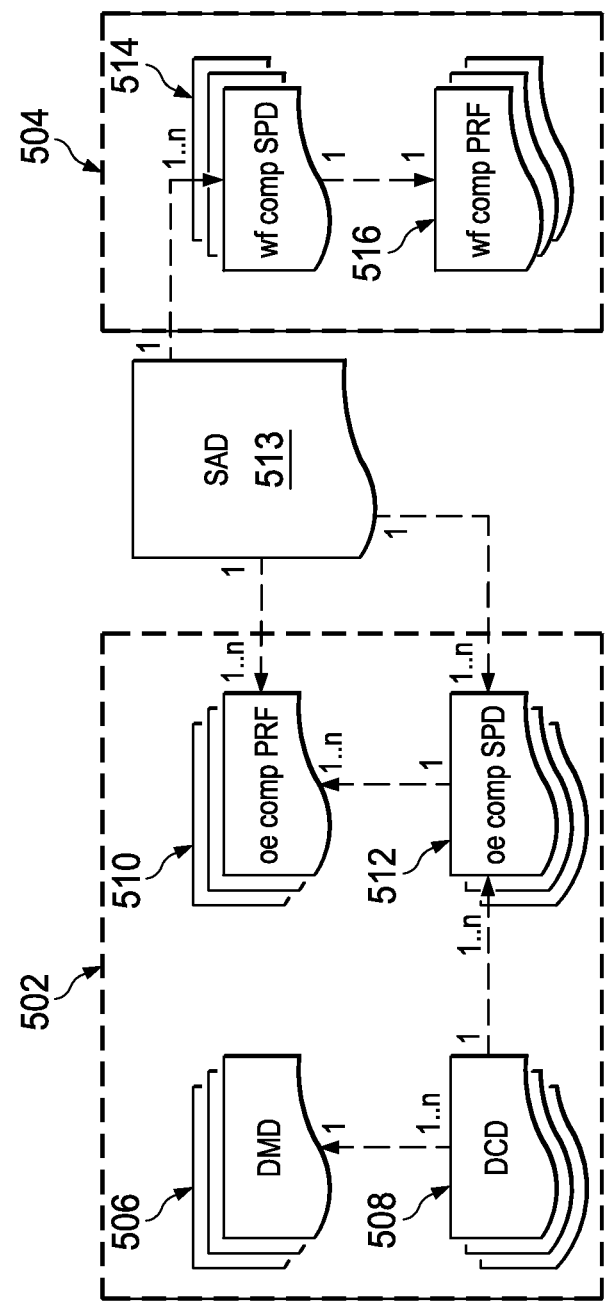
FIG. 5 is an illustration of a waveform profile and an operating environment profile in accordance with an illustrative embodiment.

With reference now to FIG. 5, an illustration of a waveform profile and an operating environment profile is depicted in accordance with an illustrative embodiment. In this illustrative example, operating environment profile 502 and waveform profile 504 are depicted. In this illustrative example, operating environment profiles 502 and waveform profile 504 may be examples of implementations for profiles in number of profiles 126 in FIG. 1. Both operating environment profiles 502 and waveform profile 504 may be extensible markup language (XML)-profiles.

Operating environment profile 502 may be formed by domain manager configuration descriptors 506, device configuration descriptors 508, operating environment component properties descriptors 510, and operating environment component software package descriptors 512. Waveform profile 504 may be formed by software assembly descriptor (SAD) 513, waveform component software package descriptors 514, and waveform component properties descriptors 516. Software assembly descriptor 513 may be used to define how waveform (wf) profile 504 links to operating environment profile 502.

A domain manager configuration descriptor (DMD) may provide the location of the software package descriptor file for a specific domain manager. Further, this type of descriptor may also specify connections to other software components that may be required by the domain manager.

A device configuration descriptor (DCD) may identify all devices and services associated with a device manager. A properties descriptor (PRF) may contain information about the properties applicable to a software package or a device package. These properties may include, for example, configuration, test, execute, and allocation types. A software component descriptor may identify information about the implementation of a software component.

Figure 6:
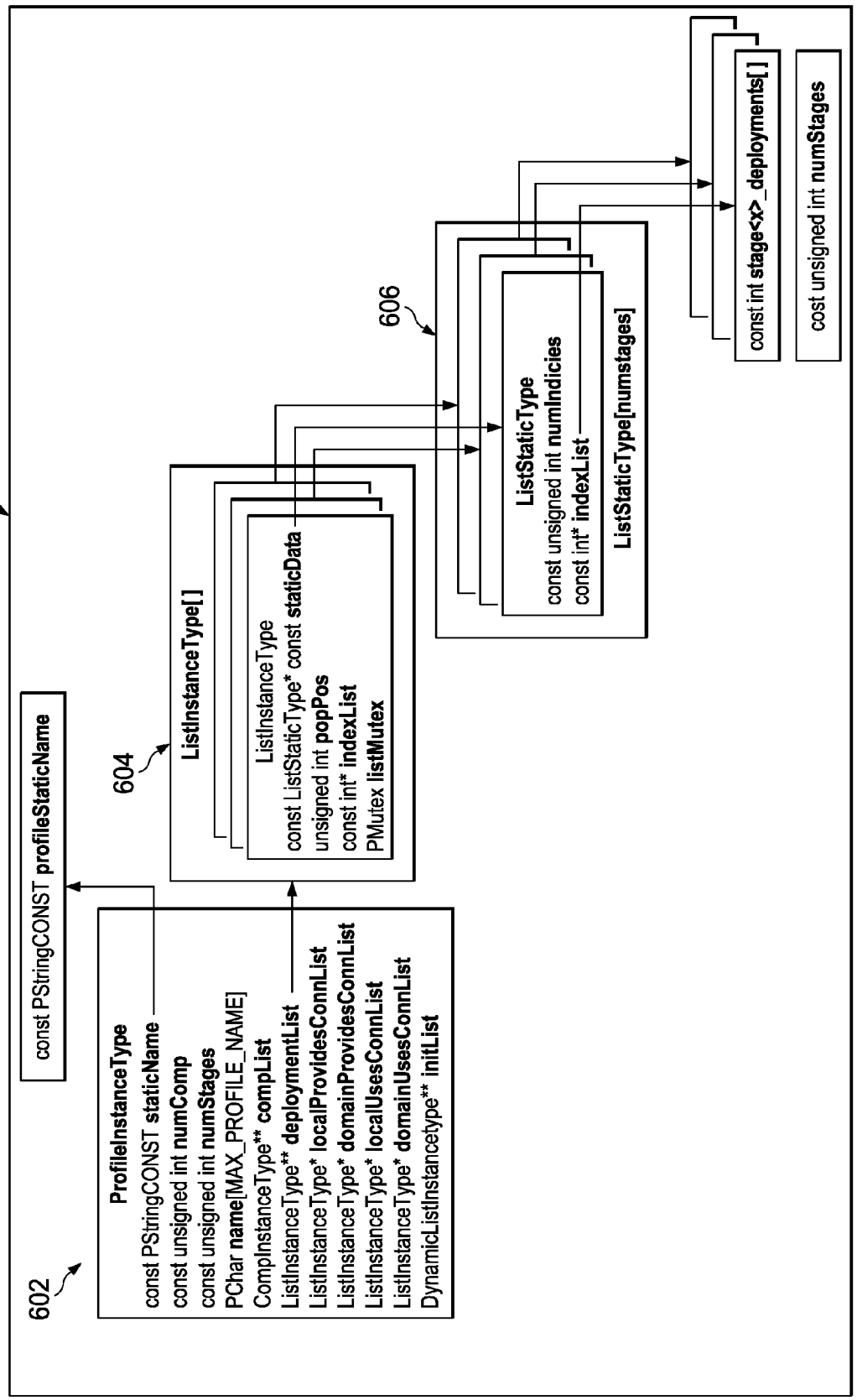
FIG. 6 is an illustration of different types of substructures for a profile structure in a number of profile structures in accordance with an illustrative embodiment.
Figure 7:
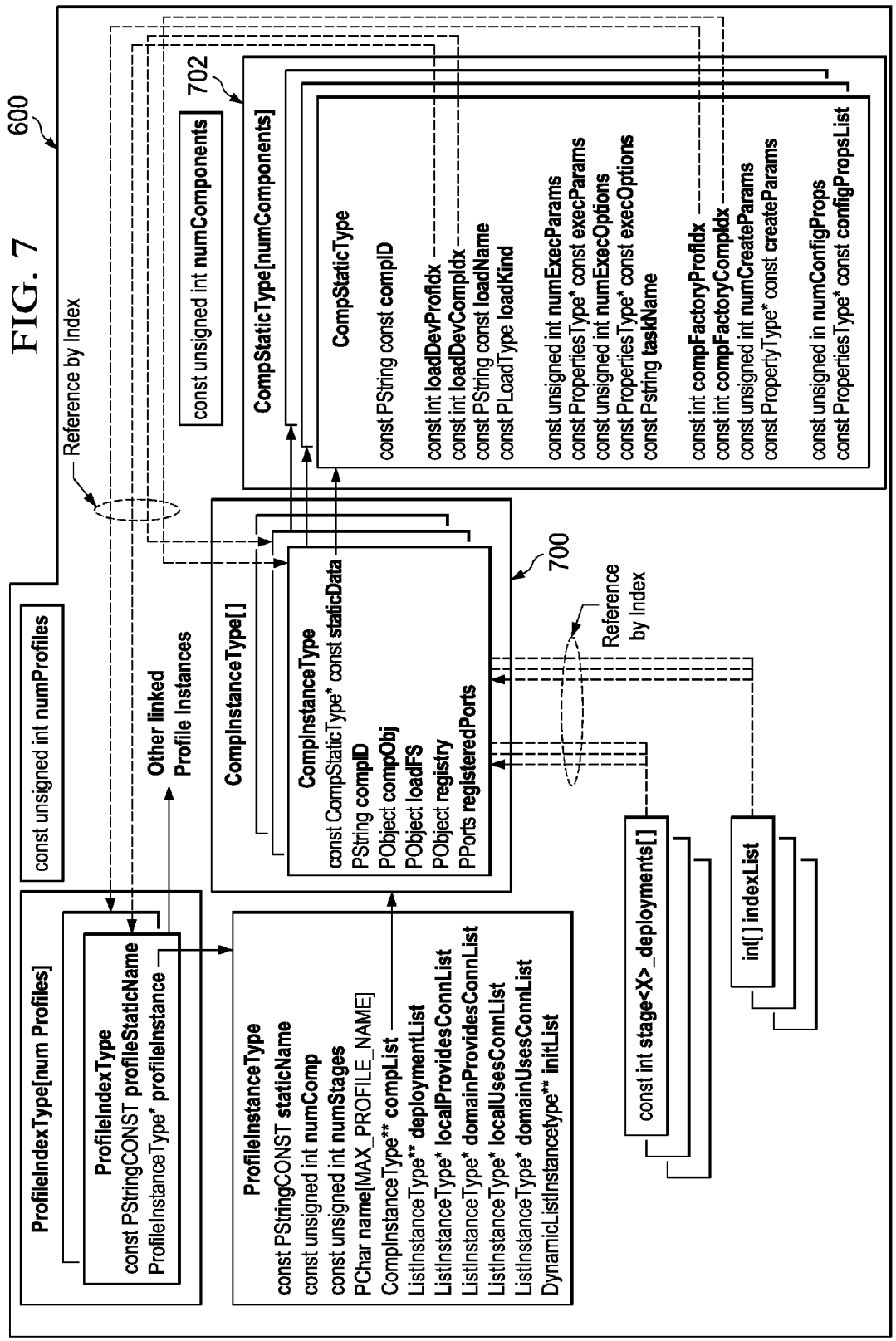
FIG. 7 is another illustration of different types of substructures for a profile structure in a number of profile structures in accordance with an illustrative embodiment.

With reference now to FIGS. 6-7, illustrations of different types of substructures for a profile structure in a number of profile structures are depicted in accordance with an illustrative embodiment. Profile structure 600 may be an example of one implementation for profile structure 136 in FIG. 1. The different substructures 602 shown in FIGS. 6-7 may be examples of how substructures for a profile structure, such as the substructures in set of substructures 138 for profile structure 136 in FIGS. 1-2, may be implemented.

For example, list instance type structure 604 and list static type structure 606 may be examples of some of substructures 602 depicted in FIG. 6. List instance type structure 604 may be an example of one implementation for a dynamic substructure in number of dynamic substructures 200 in FIG. 2. In particular, list instance type structure 604 may be an example of one implementation for a list instant type structure in number of list instance type structures 206 in FIG. 2.

Further, list static type structure 606 may be an example of one implementation for a static substructure in number of static substructures 202 in FIG. 2. In particular, list static type structure 606 may be an example of one implementation for a list static type structure in number of list static type structures 220 in FIG. 2.

In FIG. 7, component instance type structure 700 and component static type structure 702 are depicted as examples of some of substructures 602 in FIG. 6 for profile structure 600. Component instance type structure 700 may be another example of one implementation for a dynamic substructure in number of dynamic substructures 200 in FIG. 2. In particular, component instance type structure 700 may be an example of one implementation for a component instant type structure in number of component instance type structures 210 in FIG. 2.

Further, component static type structure 702 may be another example of one implementation for a static substructure in number of static substructures 202 in FIG. 2. In particular, component static type structure 702 may be an example of one implementation for a component static type structure in number of component static type structures 222 in FIG. 2.

The illustrations of profile structure 600 in FIGS. 6-7 and the various static and dynamic substructures shown in FIGS. 6-7 are not meant to imply physical or architectural limitations to the manner in which an illustrative embodiment may be implemented. Other substructures in addition to or in place of the ones illustrated may be used. Some substructures may be optional.

Figure 8:
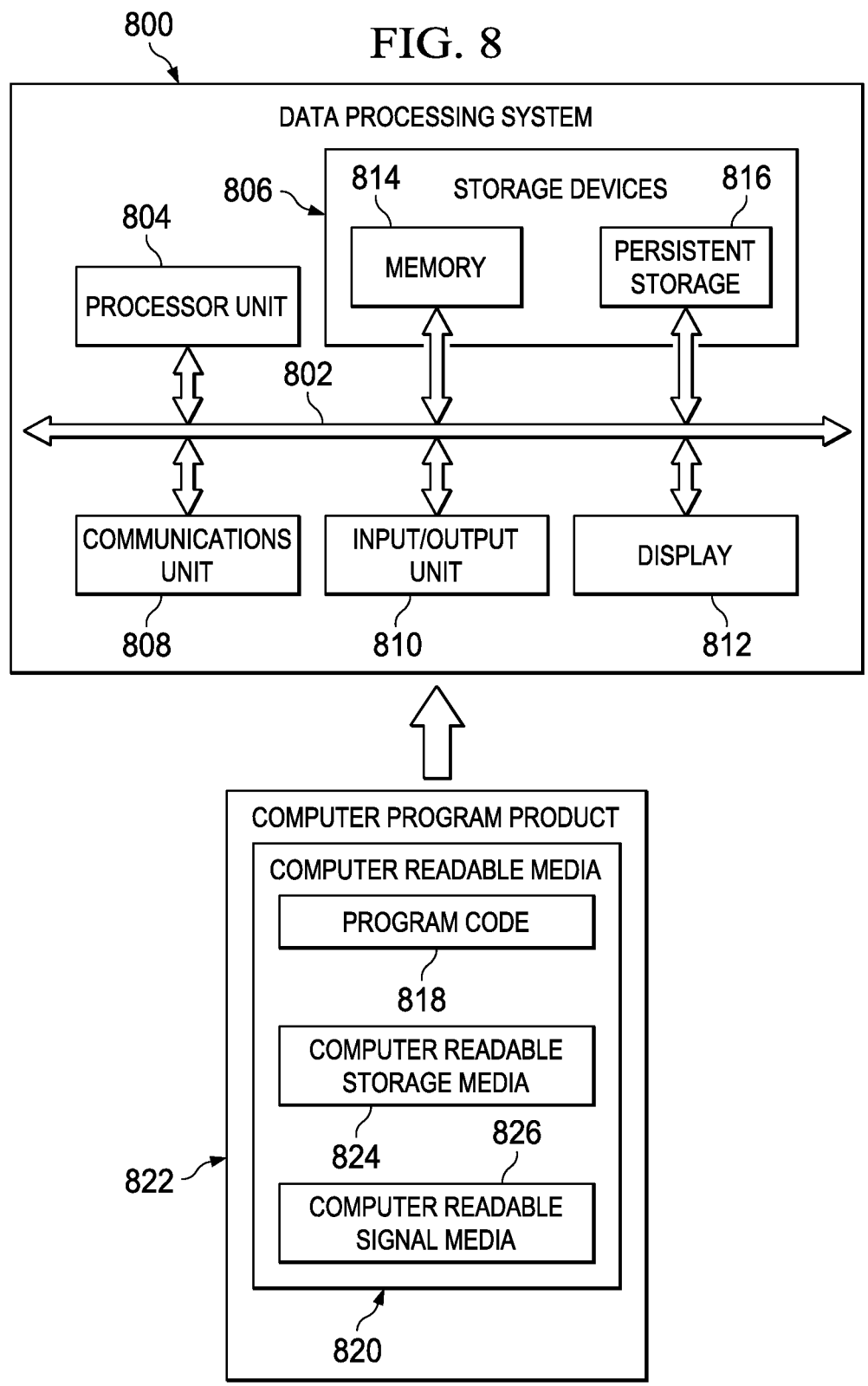
FIG. 8 is an illustration of a data processing system in the form of a block diagram in accordance with an illustrative embodiment.

Turning now to FIG. 8, an illustration of a data processing system in the form of a block diagram is depicted in accordance with an illustrative embodiment. Data processing system 800 may be used to implement receiver 110, transmitter 112, controller 114, pre-compiler 122, compiler 124, and/or other components within radio 102 in FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, a random access memory or some type of volatile or non-volatile storage device. Persistent storage 816 may comprise any set of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/ output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a pre-compiler stored in a memory configured to receive a number of profiles for a software defined radio (SDR) in a first format and to generate a number of profile structures in a second format during build time based on the number of profiles in which a profile structure in the number of profile structures corresponds to a profile in the number of profiles and includes a set of substructures comprised of a number of dynamic substructures and a number of static substructures, wherein the set of substructures include static attributes that remain fixed during runtime operation of the software defined radio, and wherein the set of substructures further include dynamic attributes that may be modified during runtime operation of the software defined radio; and
a compiler configured to convert the number of profile structures into compiled code during the build time for use in deploying a set of components on the software defined radio at runtime, wherein the compiled code comprises an executable capable of running on the software defined radio.

2. The apparatus of claim 1, wherein the first format is based on an extensible markup language and wherein the second format is based on a selected programming language.

3. The apparatus of claim 2, wherein the selected programming language is a high level programming language selected from one of C or C++.

4. The apparatus of claim 1, wherein the number of dynamic substructures is modifiable after the build time during the runtime and wherein the number of static substructures is not modifiable after the build time during the runtime.

5. The apparatus of claim 1, wherein the number of static substructures is configured to be loaded into read-only-memory on the software defined radio during the runtime.

6. The apparatus of claim 1, wherein the set of substructures generated by the pre-compiler during the build time includes at least one of a number of component instance type structures and a number of component static type structures.

7. The apparatus of claim 1, wherein the number of dynamic substructures generated by the pre-compiler during the build time includes at least one of a profile instance type structure, a number of list instance type structures, a number of dynamic list instance type structures, a number of component instance type structures, a number of provide connection component instance type structures, a number of provide connection instance type structures, or a number of dynamic integer structures.

8. The apparatus of claim 1, wherein the number of static substructures generated by the pre-compiler during the build time includes at least one of a number of constant structures, a number of list static type structures, a number of component static type structures, a number of provide connection component static type structures, a number of provide connection static type structures, a number of uses connection component type structures, a number of uses connection type structures, or a number of properties type structures.

9. The apparatus of claim 1, wherein the compiler is configured to process the number of profile structures during the build time by at least one of dynamically linking, statically linking, or compiling the number of profile structures to form the compiled code.

10. A communications system comprising:
a software defined radio (SDR) configured to deploy a set of components for use in configuring an operating environment of the software defined radio and forming at least one waveform; and
a profile processor stored in a memory comprising:
a pre-compiler configured to receive a number of profiles for the software defined radio in an extensible markup language and to generate a number of profile structures in a high level programming language during build time based on the number of profiles in which a profile structure in the number of profile structures corresponds to a profile in the number of profiles and includes a set of substructures comprised of a number of dynamic substructures and a number of static substructures, wherein the set of substructures include static attributes that remain fixed during runtime operation of the software defined radio, and wherein the set of substructures further include dynamic attributes that may be modified during runtime operation of the software defined radio; and
a compiler configured to convert the number of profile structures into compiled code during the build time for use in deploying the set of components on the software defined radio at runtime, wherein the compiled code comprises an executable capable of running on the software defined radio.

11. A method executed by a hardware processor unit for processing a number of profiles for a software defined radio (SDR), the method comprising:
receiving, by a pre-compiler, a number of profiles for the software defined radio in a first format;
generating a number of profile structures in a second format during build time based on the number of profiles received, wherein a profile structure in the number of profile structures corresponds to a profile in the number of profiles and includes a set of substructures comprised of a number of dynamic substructures and a number of static substructures, wherein the set of substructures include static attributes that remain fixed during runtime operation of the software defined radio, and wherein the set of substructures further include dynamic attributes that may be modified during runtime operation of the software defined radio; and
converting the number of profile structures into compiled code during the build time for use in deploying a set of components on the software defined radio at runtime, wherein the compiled code comprises an executable capable of running on the software defined radio.

12. The method of claim 11, wherein receiving the number of profiles for the software defined radio in the first format comprises:
receiving, by the pre-compiler, the number of profiles for the software defined radio in the first format in which the first format is based on an extensible markup language.

13. The method of claim 11, wherein generating the number of profile structures in the second format comprises:
generating, by the pre-compiler, the number of profile structures in the second format during the build time, wherein the second format is based on a selected programming language.

14. The method of claim 11, wherein generating, by the pre-compiler, the number of profile structures in the second format, wherein the second format is a selected programming language, comprises:
generating, by the pre-compiler, the number of profile structures during the build time using a high level programming language selected from one of C or C++.

15. The method of claim 11, wherein generating the number of profile structures in the second format comprises:
generating, by the pre-compiler, the number of dynamic substructures for the profile structure during the build time, wherein the number of dynamic substructures includes at least one of a profile instance type structure, a number of list instance type structures, a number of dynamic list instance type structures, a number of component instance type structures, a number of provide connection component instance type structures, a number of provide connection instance type structures, or a number of dynamic integer structures.

16. The method of claim 11, wherein generating the number of profile structures in the second format comprises:
generating, by the pre-compiler, the number of static substructures for the profile structure during the build time, wherein the number of static substructures includes at least one of a number of constant structures, a number of list static type structures, a number of component static type structures, a number of provide connection component static type structures, a number of provide connection static type structures, a number of uses connection component type structures, a number of uses connection type structures, or a number of properties type structures.

17. The method of claim 11, wherein converting the number of profile structures into the compiled code during the build time comprises:
processing, by the compiler, the number of profile structures during the build time by at least one of dynamically linking, statically linking, or compiling the number of profile structures to form the compiled code.

18. The method of claim 11, wherein performing the generating step and the converting step during the build time reduces radio startup times and component deployment times for the software defined radio.

19. The method of claim 11 further comprising:
loading the number of static substructures into read-only-memory on the software defined radio.

20. The method of claim 11 further comprising:
deploying the set of components on the software defined radio using the compiled code to configure an operating environment of the software defined radio and form at least one waveform to at least one of modulate or demodulate data within the software defined radio.

* * * * *